UNITED STATES PATENT OFFICE 2,368,230

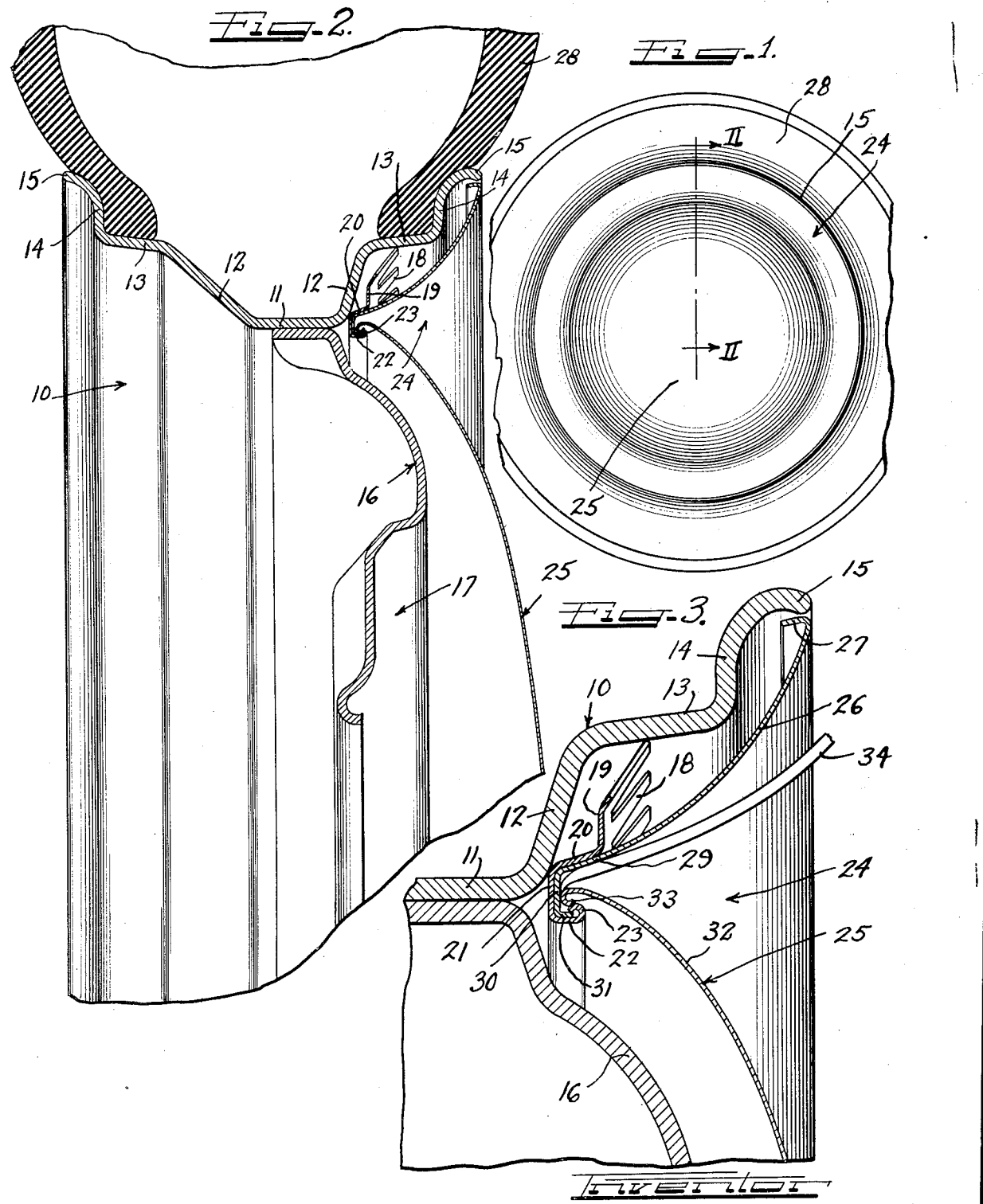

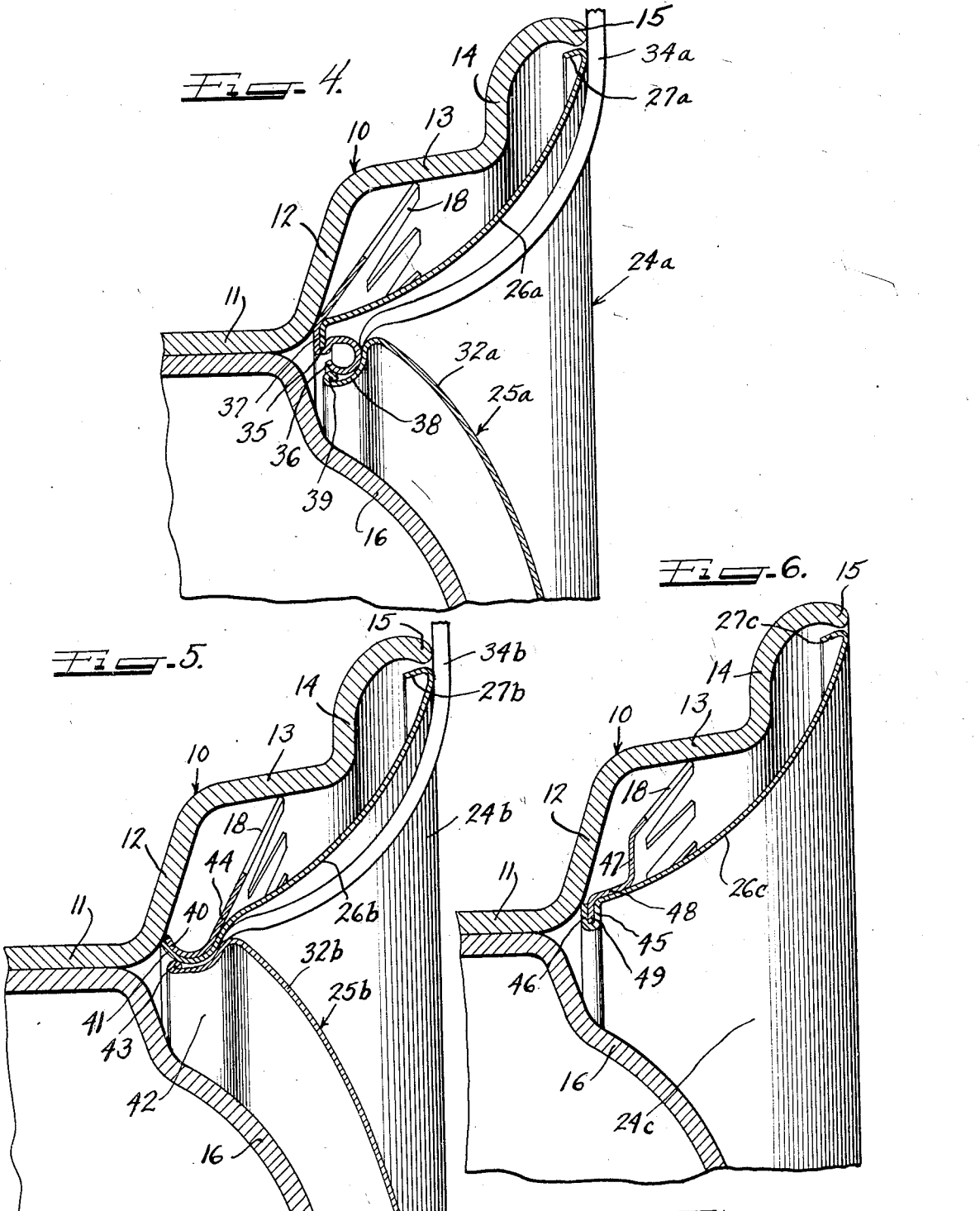

WHEEL STRUCTURE

George Albert Lyon, Allenhurst, N. J.

Application August 8, 1941, Serial No. 405,926

8 Claims. (Cl. 301—37)

This invention relates to an improved wheel construction and more particularly to a wheel disc structure having a novel, ornamental wheel cover connected to the wheel.

An object of the invention is to provide a wheel disc structure having a wheel cover of a novel construction which is cheap to manufacture and may be assembled in mounted relationship in a simple manner.

Another object of the invention is to provide an improved wheel cover structure which is constructed and arranged to simulate a continuation of the side wall of a tire which is mounted upon the wheel rim to which the wheel cover is secured.

A still further object of the invention is to provide means for securing the wheel cover to the wheel in an improved manner.

A more specific object of the invention is to provide a novel multi-part ornamental wheel cover, the parts of which are connected together in such a way as to cooperate with retaining means on the wheel in an improved manner.

A further object of the invention is to provide an ornamental wheel cover construction which may be removed from the wheel structure with greater facility and efficiency than heretofore.

To the end that above objects may be attained and in accordance with the general features of this invention there is provided herein a wheel construction including a tire mounting rim and an ornamental wheel cover, the latter including a central crown portion and an outer annular trim ring portion secured to retaining means which in turn affords an efficient connection with the wheel structure proper. The annular trim ring portion of the wheel cover has its outer peripheral edge contiguous with the outer edge of the adjacent portion of the tire rim and is formed with a concavo-convex configuration to simulate a continuation of the side wall of a tire mounted upon the tire rim to which the wheel cover is attached.

In the past, the ornamentation afforded by the usual ornamental wheel cover has been obtained in a large measure by the contrasting effect of a highly polished metallic surface provided thereby with the remainder of the wheel structure and with the vehicle with which it is associated. In order to obtain this attractive, highly finished metallic apearance, however, it is necessary that the wheel cover be made either from stainless steel or that it be provided with heavy chromium plating. However, as is well known both stainless steel and chromium plated metal is very expensive and furthermore, are more subject to becoming unavailable through scarcity than are cheaper metals.

The invention herein contemplates the utilization of such cheaper metals for ornamental discs and it is further contemplated that the ornamental effects be obtained with discs made of such cheaper metals and by painting the same. To this end, as above stated, the invention further contemplates the provision of a wheel cover which is so constructed and secured to the wheel construction proper that it may be arranged therewith to simulate a continuation of the exposed base of the outer side walls of the tires which are mounted on the tire rim. If white wall tires are used and the cover is painted to conform to the color of the tire walls then the cover has the appearance of a continuation of these walls. If, however, black wall tires are used and the disc is similarly painted white then the result obtained is a simulation of white wall tires. As stated above this simulated effect is made possible by the construction and arrangement of the parts as more particularly explained hereinafter.

Other objects and features of the invention will become apparent from the following description and accompanying drawings in which:

Figure 1 is a fragmentary side elevation of a wheel construction embodying the invention.

Figure 2 is a fragmentary cross-sectional view taken on the line II—II of Figure 1.

Figure 3 is an enlarged fragmentary view of a portion of Figure 2.

Figure 4 is an enlarged fragmentary view of a modified form of the invention.

Figure 5 is an enlarged fragmentary view of a further modified form of the invention; and, Figure 6 is an enlarged fragmentary view of a still further modified form of the invention.

As shown in Figure 2 the tire rim 10 is of the usual drop center type and has a base flange 11, side flanges 12, intermediate flanges 13 and intermediate wall flanges 14 terminating in an arcuately formed outer edge portion 15. The wheel construction is further provided with a body part 16 which has a central hub portion designated generally at 17.

In order that the wheel cover, to be described presently, is securely maintained in proper relationship to the wheel construction there is provided in the construction shown in Figures 2 and 3, a retaining ring member which includes outwardly, radially extending, angularly disposed fingers 18, a radially inwardly disposed flange 19, a substantially axially inwardly disposed flange 20, a radially inwardly disposed flange 21 and an axially disposed flange 22 having its outer peripheral edge formed into a bead 23 which provides a hump for purposes to be described presently. It will be noted that the corner junction formed between flanges 20 and 21 abuts the outer wall of the rim 10 to afford further support for the wheel disc on the rim 10.

The fingers 18 are constructed to possess inherent resiliency and the outer edges thereof lie in a circumference which is normally larger than that of the member in which the ring is to be fitted. This being the case, it will be seen that when the ring is inserted against the inner surface of the flange 13 of the tire rim, the fingers 18 will bear against this surface and the end edges thereof will bite into the metal of the tire rim so that any tendency of the ring to move outwardly will merely cause the fingers 18 to bite further into the metal of the rim to enhance its engagement therewith.

In the construction shown in Figures 2 and 3 the wheel cover includes an outer annular marginal portion 24 and a central crown portion 25.

The annular, trim ring portion 24 of the wheel cover includes an intermediate portion 26 having an arcuate transverse cross section, its outer marginal edge terminating in an inwardly turned flange 27 in close proximity to the portion 15 of the wheel rim thereby to provide an even, smooth, exposed edge.

As will be seen from Figure 2 the wall of the tire 28 so far as that part which is visible when the tire is mounted is concerned, also terminates in the vicinity of the portion 15 of the tire rim. Consequently, since the wheel cover, particularly the marginal portion 24, is constructed and arranged to extend to the edge portion 15 of the rim 10 and is formed with an arcuate cross section similar to that of the adjacent tire wall, the portion 26 simulates a continuation of the side wall of the tire. If a tire is white walled and the outer surface of the arcuate portion 26 is similarly colored it will be understood that the appearance will be that of a continuation of the white wall of the tire. If, however, the tire is black and the outer surface of the portion 26 is painted white the effect thereof will be a simulation of a continuation of the tire side wall with the result that a tire which is entirely black will appear to have white walls To the end that the marginal portion 24 of the wheel cover may be securely mounted in the above described position it is curved inwardly and substantially axially as at 29, this substantially axially disposed portion being adapted to lie in juxtaposition to the flange portion 20 of the retaining ring member. The wheel cover is further formed with a radially disposed flange 30 which is adapted to abut the flange 21 of the retaining member and the inner peripheral edge thereof terminates in an axially disposed flange 31 which is disposed adjacent to flange 22 of the retaining member, the inner peripheral edge of the wheel disc being adapted to fit within the bead 23 of the retaining member as is clearly shown in Figure 3. From the foregoing it will be seen that the marginal portion 24 of the wheel cover is securely mounted within the retaining member by an interlocking junction and the retaining member in turn, is securely mounted on the tire rim proper.

The central crown portion 25 of the wheel cover includes a central arcuate section 32 and a peripheral marginal portion which is beaded as shown at 33 to provide strength for the edge of said crown portion and also to provide spring-like resiliency at the edge whereby it may be engaged over the hump formed by the aforementioned interlocking junction, the hump being formed, in the present construction by the bead 23. The bead 33 engages the bead 23 in its entirety for snap-on engagement therewith and pry-off removal therefrom.

From the foregoing it will be seen that there has been provided a wheel construction in which the entire body part 16 and tire rim 10 is concealed by an improved ornamental wheel cover. Furthermore, the disc is so constructed and arranged that by properly decorating the outer surface of the marginal portion thereof, a continuation of the side wall of the tire is simulated and the wheel structure generally appears to be composed of merely a tire having a centrally disposed, crowned cover.

As previously described the inner portion of the arcuate section 26 is adapted to lie in juxtaposition to the adjacent surface of the flange 20 of the retaining member. Since the wheel cover is made from any suitable thin material such as sheet metal this relationship of the flange 20 with the cover is highly important. In order that the hub may be exposed for removal of the wheel structure from a vehicle it is necessary that the crown portion 25 of the wheel cover be removed from time to time. This is best accomplished by means of a pry-off tool such as that shown at 34 in Figure 3.

The tool 34 is provided with a suitable reduced end which may be engaged against the bead 33 of the crown portion 25. If then the outer end of the tool 34 is raised, when it is placed in the position shown in Figure 3, the bead 33 will be urged resiliently over the bead 23 to disengage the same. In accomplishing this, however, it will be seen that the upper surface of the tool must necessarily bear against some part of the wheel construction to obtain the proper leverage and in the present instance the only portion of the wheel construction available is the thin sheet metal arcuate section 26 of the marginal portion of the wheel cover. Ordinarily the exertion of such forces against this marginal portion might dent the same. However, as will be seen from Figure 3, the reinforcement provided by the flange 20 of the retaining member obviates the possibility of dents being made as above described.

From the foregoing it will be seen that, due to the increased depth of flanges 21 and 30 of the retaining member and the portion 24 of the wheel cover respectively, considerable clearance is provided for insertion of the tool 34, thus greatly facilitating the removal of the crown portion 25 of the wheel cover.

In the modifications shown in Figures 4, 5 and 6 like numerals refer to like parts throughout.

Referring particularly to Figure 4 the retaining member shown therein is similar to that shown in Figures 2 and 3 insofar as the presence of the fingers 18 is concerned. However, the inner periphery thereof is formed to provide a radial groove 35 and an enlarged inwardly extending bead 36 which forms a retaining hump for purposes to be described presently.

While the trim ring portion 24a of the wheel cover is likewise similar to the portion 24 shown in Figures 2 and 3 in that it is provided with the arcuate intermediate portion 26a and the flange 27a, the inner peripheral edge thereof may, because of the presence of the radial flange 35 in the retaining member, be of extremely simple construction and include merely an inwardly extending radial flange 37 adapted to interfit with the radial flange 35 to retain the marginal portion 24a of the wheel cover securely in the retaining member. As shown in Figure 4 the center crown portion 25a is similarly provided with an arcuate section 32a. However, as there shown, it is provided with an inwardly disposed arcuate flange 38 and a terminal strengthening bead 39 whereby it may be secured in assembled relationship with the retaining member by springing the bead 39 over the hump formed by the enlarged bead 36 to bring the latter bead into substantial nested relationship with the arcuate flange 39.

Here again clearance is provided for the tool 34a by increased depth of the flange 37 of the marginal portion 24a which disposes the arcuate surface of the latter in spaced relationship to the edge of the crown portion 25.

In this construction the tool 34a may be inserted behind the bend junction formed between the crown 32a and the arcuate flange 38 and being bent, as shown in Figure 4, so that leverage is obtained by abutment with the edge portion 15 of the rim 10, slight movement of the tool will disengage the bead 39 from the bead 36.

In the modification shown in Figure 5 the retaining member is similarly provided with fingers 18. However, the inner peripheral margin thereof is formed into an inwardly extending half bend as shown at 40, the inner peripheral margin of the portion 24b of the wheel cover being similarly formed to conform to the configuration of this half bend as shown at 41 whereby the portion 24b is maintained on the retaining member in assembled relationship. In this construction it will be seen that the retaining ring together with the marginal portion 24b of the wheel cover is urged inwardly of the tire rim sufficiently so that the peripheral edges thereof abut the outer surface of the rim 10 to increase the support afforded by the fingers 18.

In the construction shown in Figure 5 the crown portion 25b of the wheel cover is provided with a central arcuate section 32b and has its peripheral margin formed to provide a flange 42, this flange terminating in a bead 43 formed at the peripheral edge thereof. As in the previously described modification the bead 43 serves to strengthen the edge of the crown portion 25b and also to afford resiliency to enhance a snap-on engagement of the crown portion 25b with the inner surface of the half bend 40 and 41 of the marginal portion 24b and the retaining member respectively.

In this construction it will be seen that the annulus 44 of the retaining member serves in part to reinforce the adjacent portion of the metal from which the marginal portion 24b is formed. Consequently, when the tool 34b is inserted between the bend formed by the junction of the flange 42 with the crown portion 32b and the adjacent surface of the thin metal from which the marginal portion 24b is formed, to remove the crown portion 25b of the wheel cover, the section 44 of the retainer will reinforce the thin metal of the marginal portion 24b and prevent denting thereof. If desired, the tool 34b may be so formed that the leverage for removal of the crown portion 25b is obtained by abutment with the edge portion 15 of the rim 10.

In the modification shown in Figure 6 the marginal portion 24c of the wheel cover is provided with the arcuate intermediate section 26c and the inner peripheral margin thereof is bent so as to form an inwardly extending flange 45 which in turn is bent back upon itself as at 46 to provide an outwardly opening peripheral groove. With such a construction it will be seen that a minimum of bending and forming operations are required and furthermore the cross-sectional shape of the retaining member may likewise be simplified.

In this modification the retaining member is merely formed to provide a flange 47, a flange 48 and an inwardly extending peripheral flange 49 which is adapted to lie in the groove formed by the flanges 45 and 46 of the marginal portion 24c.

As in the modification of Figure 2 the flange 48 of the retaining member provides a re-enforcing backing member for the adjacent section of the trim ring portion 24c.

As will be understood by those skilled in the art, wheel covers are subjected to considerable abuse as a result of loose stones being impelled thereagainst and thus denting the metal and by abrasion of the wheel covers against curbs and the like. As previously explained the wheel cover herein is made from relatively thin sheet metal, and consequently, the ornamental effects thereof, particularly of the marginal portions 24, 24a, 24b and 24c, will be considerably marred if protective measures are not taken.

It will be readily understood that a thin sheet metal object which is held in a rigid, non-yieldable position will be more subject to marring and denting than will the same object when maintained in a resilient or yieldable position. In the first instance there is no give and an object striking the cover will thus cause a dent in the metal. In the second instance, however, since the object is yieldable, the stone or the like impelled thereagainst will cause a yielding movement of the object and its force will thus be spent in moving the same rather than in distorting the metal thereof.

By reference to the drawings it will be seen that provision for such yieldable mounting of the trim ring portions 24, 24a, 24b and 24c of the wheel cover has been provided in that the periphery thereof as defined by the bend between the intermediate portion 26 and the flange 27 is disposed in spaced relationship to the outer edge portion 15 of the wheel rim. Consequently, there is provided a flexing of the marginal portion 24 about its junction with the respective retaining members.

From the foregoing it will be seen that there is provided herein a novel wheel cover construction wherein the marginal portion and the central crown portion are efficiently mounted to a tire rim by a single retaining member; wherein the central crown portion may be removed by a pry-off action without causing dents in the marginal portion; wherein the ornamental effects of the wheel cover are greatly enhanced by the construction and arrangement of the improved wheel cover and wherein the ornamental marginal portion of the cover is protected from becoming dented and otherwise marred by the provision of a resilient mounting therefor.

What I claim is:

1. In combination, a wheel including a tire rim, retaining means engageable with said rim for attachment thereto, a wheel cover including a central crown portion having a beaded periphery and an outer annular portion having the inner periphery thereof formed to provide an interlocking junction with said retaining means, said interlocking junction including a hump adapted to receive the beaded periphery of said central crown portion in snap-on relationship.

2. In combination, a wheel including a tire rim, a retaining member engageable with said rim, said retaining member including outwardly, radially disposed finger elements adapted to engage the surface of a part of said rim and bite into the same and having an inner peripheral edge, a wheel cover including a central crown portion having a beaded periphery and an annular portion adapted to be disposed peripherally outwardly of said crown portion and having the inner periphery thereof formed to provide an interlocking junction with said inner peripheral edge of said retaining member said interlocking junction including a hump adapted to receive the beaded periphery of said central crown portion in snap-on engagement.

3. In combination a wheel including a tire rim, a wheel cover mounted on the rim and including an annular portion having an outer peripheral edge disposed adjacent the edge portion of the rim, and a crown portion having a peripheral bead thereon, an annular retaining member for securing said annular portion to said tire rim, said retaining member including outwardly, radially extending fingers adapted to bite the adjacent surface of the tire rim when said member is pressed inwardly thereof, and having the periphery thereof formed to provide an interlocking junction with the inner periphery of said annular portion, said junction including an annular hump adapted to receive the bead of said crown portion in resilient snap-on relationship.

4. In combination, a wheel having a tire rim, a wheel cover including a central crown portion having a peripheral bead, retaining means for securing said wheel cover to said tire rim including an outer peripheral edge adapted to engage said rim in mounted relationship and an inner periphery formed with a substantially axially disposed flange, said retaining means being provided with a hump formation inwardly of said flange, said hump being adapted to receive the bead of said crown portion in snap-on relationship and said flange affording an abutment surface for a pry-off tool to obtain leverage for urging the bead or said crown portion over said hump.

5. In a combination, a wheel including a tire rim, a wheel cover including a central crown portion having a beaded periphery and an annular portion, retaining means for mounting said cover on the wheel rim, said retaining means having retaining engagement with said rim and being arranged to receive the inner peripheral edge of said annular portion in interlocking relationship to form a hump adapted to receive the bead of said crown portion in resilient, snap-on relationship, said annular portion having an inwardly extending, substantially axially disposed section radially outwardly removed from said hump to afford clearance for the insertion of a pry-off tool behind said bead to urge the same off said hump for removal of said crown portion.

6. In combination, a wheel including a tire rim, a wheel cover including an outer annular portion having an inner periphery formed in a radially disposed flange and a central crown portion having a beaded periphery, a retaining member securable to said rim having a peripheral edge formed to provide a radial groove adapted to receive said radial flange of said annular member to retain the same on the tire rim, said retaining member having a bead formed at the inner periphery thereof to engage the bead on said crown portion to retain the latter on the tire rim in snap-on relationship.

7. In combination, a wheel including a tire rim, a wheel cover including an outer annular portion having an inwardly, substantially axially disposed curved flange at the inner periphery thereof, and a central crown portion having a bead on the periphery thereof, a retaining member securable to said rim having a peripheral edge formed to provide an inwardly, substantially axially disposed curved flange adapted to interlock in nested relationship with the flange on said annular portion, said bead on the periphery of said crown portion being adapted to engage said curved nested flanges in resilient snap-on relationship.

8. In combination, a wheel including a tire rim, a retaining member securable to said rim and having an inner peripheral margin formed with a substantially axially disposed flange, a substantially radially disposed flange, an outwardly projecting, substantially axially disposed flange terminating in a radially outwardly disposed bead, a wheel cover including an outer annular portion and a central crown portion, said annular portion having an inner periphery formed to conform to the configuration of the peripheral margin of said retaining member and terminating in a peripheral edge bounded by said radially outwardly disposed bead, said central portion having a peripheral bead adapted for resilient snap-on engagement with the bead on said retaining member.

GEORGE ALBERT LYON.